(12) United States Patent
Hada

(10) Patent No.: US 9,160,728 B2
(45) Date of Patent: Oct. 13, 2015

(54) MESSAGE SENDING/RECEIVING METHOD

(71) Applicant: INTERNATIONAL BUSINESS MACHINES COPORATION, Armonk, NY (US)

(72) Inventor: Satoshi Hada, Machida (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/969,532

(22) Filed: Aug. 17, 2013

(65) Prior Publication Data

US 2013/0339743 A1    Dec. 19, 2013

Related U.S. Application Data

(63) Continuation of application No. 12/910,809, filed on Oct. 24, 2010, now Pat. No. 8,516,261.

(30) Foreign Application Priority Data

Oct. 30, 2009 (JP) ................... 2009-250934

(51) Int. Cl.
*H04L 29/06* (2006.01)
*H04L 9/32* (2006.01)
(Continued)

(52) U.S. Cl.
CPC ................ *H04L 63/08* (2013.01); *H04L 9/002* (2013.01); *H04L 9/3247* (2013.01);
(Continued)

(58) Field of Classification Search
CPC ..... H04L 63/08; H04L 63/0428; H04L 63/06; H04L 63/062; H04L 63/0442; H04L 12/58; H04L 9/002; H04L 9/3247; H04L 9/3249; H04L 9/30; H04L 2209/08; H04L 2209/16; H04L 2209/76; H04L 2924/00014; H01L 21/79832
USPC ............... 713/176–181; 380/282, 285, 28, 30
See application file for complete search history.

(56) References Cited

U.S. PATENT DOCUMENTS

2002/0007453 A1* 1/2002 Nemovicher ................. 713/155
2003/0154371 A1   8/2003 Filipi-Martin
(Continued)

FOREIGN PATENT DOCUMENTS

JP    07-087081    3/1995

OTHER PUBLICATIONS

Christian Collberg et al, "A Taxonomy of Obfuscating Transformations". Technical Report #148, Department of Computer Science, The University of Auckland, New Zealand, 1997.
(Continued)

*Primary Examiner* — Eleni Shiferaw
*Assistant Examiner* — Hilary Branske
(74) *Attorney, Agent, or Firm* — Gail H. Zarick; Otterstedt, Ellenbogen & Kammer, LLP

(57) ABSTRACT

Signature generation key sk_s is randomized with random number r to calculate randomized signature generation key sk'_s=SigningKeyRandomize(sk_s, r). The random number r is encrypted with public encryption key pk_e to calculate an encrypted random number R=Enc(pk_e, r)). A message m is signed with the randomized signature generation key sk'_s to calculate signed message s'=Sign(sk'_s, m). The signed message s' and the encrypted random number R are sent to a recipient, where sk_s represents the secret signature generation key of a sender of the message m, pk_e represents the public encryption key of the recipient, r represents the random number, s represents a signature, Sign represents a signature generation function, s=Sign(sk_s, m) represents a signature for the message m, SigningKeyRandomize represents a function for randomizing the secret signature generation key sk_s, and Enc represents an encryption function.

18 Claims, 11 Drawing Sheets

(51) Int. Cl.
*H04L 12/58* (2006.01)
*H04L 9/00* (2006.01)

(52) U.S. Cl.
CPC .............. *H04L 9/3249* (2013.01); *H04L 12/58* (2013.01); *H04L 63/0428* (2013.01); *H04L 63/06* (2013.01); *H04L 2209/08* (2013.01); *H04L 2209/16* (2013.01)

(56) References Cited

U.S. PATENT DOCUMENTS

| | | | |
|---|---|---|---|
| 2003/0163686 | A1 | 8/2003 | Ward |
| 2007/0016788 | A1 | 1/2007 | Kakehi |
| 2007/0130069 | A1* | 6/2007 | Kay et al. .................... 705/50 |
| 2008/0144832 | A1 | 6/2008 | Kerschbaum |
| 2009/0013379 | A1* | 1/2009 | Yoshioka et al. ............ 726/2 |
| 2009/0094464 | A1 | 4/2009 | Futa |
| 2009/0327735 | A1* | 12/2009 | Feng et al. ................ 713/180 |

OTHER PUBLICATIONS

Susan Hohenberger et al, "Securely Obfuscating Re-encryption". S.P. Vadhan (Ed.): TCC 2007, LNCS 4392, pp. 233-252, 2007. International Association for Cryptologic Research.

Taherelgamal, "A Public Key Cryptosystem and a Signature Scheme Based on Discrete Logarithms". 1998, Springer-Verlag.

Dan Boner et al., "Short signatures from the Weil pairing". In C. Boyd, editor, Proceedings of Asiacrypt 2001, vol. 2248 of LNCS, pp. 514-32. Springer-Verlag, Dec. 2001.

C.P.Schnorr, "Efficient Signature Generation by Smart Cards". Fachbereich Mathematik/Informatik, Universit at Frankfurt, Mar. 1991.

Anna Lysyanskaya, "Unique Signatures and Verifiable Random Functions from the DH-DDH Separation". CRYPTO 2002, LNCS 2442, pp. 597-612, Springer-Verlag Berlin Heidelberg,2002.

Brent Waters, "Efficient Identity-Based Encryption Without Random Oracles". EUROCRYPT 2005, LNCS 3494, pp. 114-127, 2005. International Association for Cryptologic Research.

"Forward-Secure Signatures with Untrusted Update" by Xavier Boten et al, Proceedings of ACM CCS 2006, Dec. 31, 2006.

Tatsuya Toyofuku et al.,"A Note on Application of the Program Obfuscation Scheme using Rndom Numbers to Complicate Control Flow" IPSJ SIG Technical Reports, Jul. 14, 2005,vol. 105, No. 193, p. 213-220.

Don Davis, "Defective Sign & Encrypt in S/MIME, PKCS#7, MOSS, PEM, PGP, and XML", Proceedings of the 2001 USENIX Annual Technical Conference, [online], Jun. 25, 2001, p. 65-78, Retrieved on Jul. 7, 2011]. Retrieved from the Internet, U R L, <http://www.usenix.org/public ations/library/proceedings/usenix01/full_papers/davis/davis.pdf>.

Raylin Tso, Takeshi Okamoto, and Eiji Okamoto, "ECDSA-Verifiable Sign cryption Scheme with Signature Verification on the Signcrypted Message", LNCS, Information Security and ryptology, 2007, vol. 4990, p. 11-24.

Satoshi Hada, "Secure Obfuscation for Encrypted Signatures", LNCS, Advances in Cryptology—EUROCRYPT 2010, Jun. 2010, vol. 6110, p. 92-112.

* cited by examiner

900

| | FOR ENCRYPTION | | FOR SIGNING | |
|---|---|---|---|---|
| | PUBLIC ENCRYPTION KEY | SECRET DECRYPTION KEY | PUBLIC VERIFICATION KEY | SECRET SIGNATURE GENERATION KEY |
| Alice | ~ | ~ | pk_s | pk_s |
| Bob | pk_e | pk_e | ~ | ~ |
| Carol | ~ | ~ | ~ | ~ |
| ... | ... | ... | ... | ... |

FIG. 9

MESSAGE SENDING/RECEIVING METHOD

CROSS-REFERENCE TO RELATED APPLICATION(S)

This application is a continuation of U.S. patent application Ser. No. 12/910,809 filed Oct. 24, 2010, which in turn claims foreign priority to Japanese Patent application 2009-250934 filed 30 Oct. 2009. The complete disclosures of U.S. patent application Ser. No. 12/910,809 and Japanese Patent application 2009-250934 are expressly incorporated herein by reference in their entireties for all purposes.

FIELD OF THE INVENTION

The present invention relates to a method for sending/receiving a message (mail), and particularly relates to a method, a system, and a program for securely generating, sending, and receiving a signed message.

BACKGROUND OF THE INVENTION

A user sends and receives mails through a web browser in an online email service such as Gmail, available from Google Inc., Menlo Park, Calif., USA. Now assume that a mail is signed and then encrypted in such an environment, such as is performed through PGP or S/MIME. In other words, assume that a so-called Sign-then-Encrypt (StE) process is performed on the mail. A browser usually does not function to manage a signature generation key and an encryption key, and thus an StE process cannot be executed locally on a computer of the user. For this reason, a server holds information on a signature generation key and an encryption key, and also executes an StE process. For example, consider a case where a sender sends a recipient a mail after subjecting the mail to an StE process. In this case, a secret signature generation key of the sender and a public encryption key of the recipient are held on a server. The server uses these keys to execute the StE process on, and then send, a mail that the sender has created on a browser.

The secret signature generation key of the sender may be stolen if a malicious attacker (either an insider or an outsider) invades the server in the above environment. To cope with this, some sort of protection means is required. Japanese Unexamined Patent Application Publication No. Hei 7-87081 (Patent Literature 1) describes a method for preventing fraud in a key publicity center by not allowing the key publicity center to hold any secret signature generation key. However, Patent Literature 1 cannot provide a method for executing an StE process since the key publicity center does not hold a signature generation key from the beginning. C. Collberg, C. Thomborson and D. Low, "A Taxonomy of Obfuscating Transformations." Technical Report 148, Department of Computer Science, University of Auckland. 1997 describes various techniques for obfuscating a program written in JAVA programming language or C. A lot of such obfuscation tools, including ones commercially available, exist and can be used to obfuscate a program for an StE process. However, these tools aim to make a program difficult to read, and are not capable of preventing the revealing of a secret key completely. S. Hohenberger, G. N. Rothblum, A. Shelat, and V. Vaikuntanathan, "Securely Obfuscating Re-Encryption," Proceedings of TCC '07, 2007 (Non-patent Literature 2) describes a technique for obfuscating Re-Encryption (De-crypt-then-Encrypt: operation of decrypting a ciphertext and then encrypting the decrypted ciphertext with another key).

Non-patent Literature 2 provides a technique for obfuscating a Decrypt-then-Encrypt function, and cannot be utilized for obfuscating an StE function.

T. El Gamal, "A public key cryptosystem and signature scheme based on discrete logarithms," IEEE Trans. Inform. Theory, Vol. 31, pp. 469-472, 1985 describes well-known encryption schemes. D. Boneh, B. Lynn, and H. Shacham, "Short Signatures from the Weil Pairing," Proceedings of ASIACRYPT 2001, pp. 514-532, 2001, C. Schnorr, "Efficient Signature Generation by Smart Cards," J. Cryptology 4(3), pp. 161-174, 1991, A. Lysyanskaya, "Unique Signatures and Verifiable Random Functions from the DH-DDH Separation," Proceedings of CRYPTO '02, 2002, B. Waters, "Efficient Identity-Based Encryption Without Random Oracles," Proceedings of Eurocrypt 2005 each describe a well-known signature scheme.

SUMMARY OF THE INVENTION

In one aspect, an exemplary message sending method, for sending a message by a process of a computer including a processor and a memory, includes the steps of: randomizing a signature generation key $sk\_s$ with a random number r to calculate a randomized signature generation key $sk'\_s=SigningKeyRandomize(sk\_s, r)$; encrypting the random number r with a public encryption key $pk\_e$ to calculate an encrypted random number $R=Enc(pk\_e, r)$; signing a message m with the randomized signature generation key $sk'\_s$ to calculate a signed message $s'=Sign(sk'\_s, m)$; and sending the signed message s' and the encrypted random number R to a recipient. In the above steps, $sk\_s$ represents the secret signature generation key of a sender of the message m, $pk\_e$ represents the public encryption key of the recipient, r represents the random number, s represents a signature, Sign represents a signature generation function, $s=Sign(sk\_s, m)$ represents a signature for the message m, SigningKeyRandomize represents a function for randomizing the secret signature generation key $sk\_s$, and Enc represents an encryption function.

In some cases, the steps of signing and sending may respectively include: calculating $sk''\_s=SigningKeyRandomize(sk'\_s, r')$ with a random number r' different from the random number r in order to randomize the randomized signature generation key $sk'\_s$ again, and then signing the message m with the thus again randomized signature generation key $sk''\_s$ to calculate a signed message $s''=Sign(sk''\_s, m)$; and calculating a ciphertext R" of r×r' from the encrypted random number R and the random number r', and then sending values (s", R") to the recipient.

In some instances, the signature generation function may use any one of a BLS signature scheme, a Schnorr signature scheme, a Lysyanskaya signature scheme, and a Waters signature scheme. In addition, in some cases, the message sending method may further include the steps of: receiving the signed massage s' and the encrypted random number R; decrypting the thus received encrypted random number R with a decryption function Dec to calculate a random number $r=Dec(sk\_e, R)$; calculating a signature s from the thus received signed message s', the message m, and the random number r which is a result of the decryption; and verifying the signature s by using a verification function $Verify(pk\_s, s, m)$. In the above steps, $pk\_s$ represents the public signature verification key of the sender of the message m, $sk\_e$ represents the secret decryption key of the recipient, $Dec(sk\_e, R)$ represents the decryption function and $Verify(pk\_s, s, m)$ represents the verification function.

In another aspect, an exemplary mail sending method including the steps of: causing a server A to send information on a sender and a recipient to a key management center in response to sending of a mail m by the sender; causing the key management center to send the information on the sender and the recipient to a PKI server, and to thereby acquire, from the PKI server, the secret signature generation key sk_s of the sender and the public encryption key pk_e of the recipient; causing the server A to receive, from the key management center, a randomized signature generation key sk'_s=SigningKeyRandomize(sk_s, r) obtained by randomizing the secret signature generation key sk_s with a random number r, and an encrypted random number R=Enc(pk_e, r) obtained by encrypting the random number r with the public encryption key pk_e of the recipient; causing the server A to generate a ciphertext M=Enc(pk_e, m) of the mail m by using the public encryption key pk_e of the recipient; causing the server A to calculate s'=Sign(sk'_s, m) by using the randomized signature generation key sk'_s and the encrypted random number R; and causing the server A to send the ciphertext M of the mail m and the values (s', R) to a server B.

This mail sending method may, in some instances, further include the steps of: causing the server B to receive the ciphertext M of the mail m and the values (s', R); causing the server B to send information on the sender and the recipient to the PKI server, and to thereby acquire, from the PKI server, the public verification key pk_s of the sender and the secret decryption key sk_e of the recipient; causing the server B to decrypt the ciphertext M by using the secret decryption key sk_e of the recipient to obtain the mail m=Dec(sk_e, M), to decrypt the random number R to obtain a random number r=Dec(sk_e, R), and to calculate a signature s from the values (s', m, r); and causing the server B to verify the signature s by using a verification function Verify(pk_s, s, m).

Corresponding mail sending and/or receiving computer program products and servers are also contemplated.

BRIEF DESCRIPTION OF THE DRAWINGS

FIG. 9 is a table for managing various keys of each user.

DETAILED DESCRIPTION OF PREFERRED EMBODIMENTS

One or more embodiments completely prevent a secret key from being revealed from information held on a server. Specifically, one or more embodiments allow execution of an StE process using the held information, and to prevent the revealing of a secret signature generation key from the held information. To achieve this, one or more embodiments have a unique configuration for holding a secret signature generation key of a sender on a server. This object is not specific to an online email service, and holds for all web services and SaaS services which provide a workflow application and the like requiring an StE process. In view of an obfuscation technique, one or more embodiments obfuscate a program so as to completely prevent revealing of a secret signature generation key, the program holding the secret key and being executed for an StE process.

Figure 1:
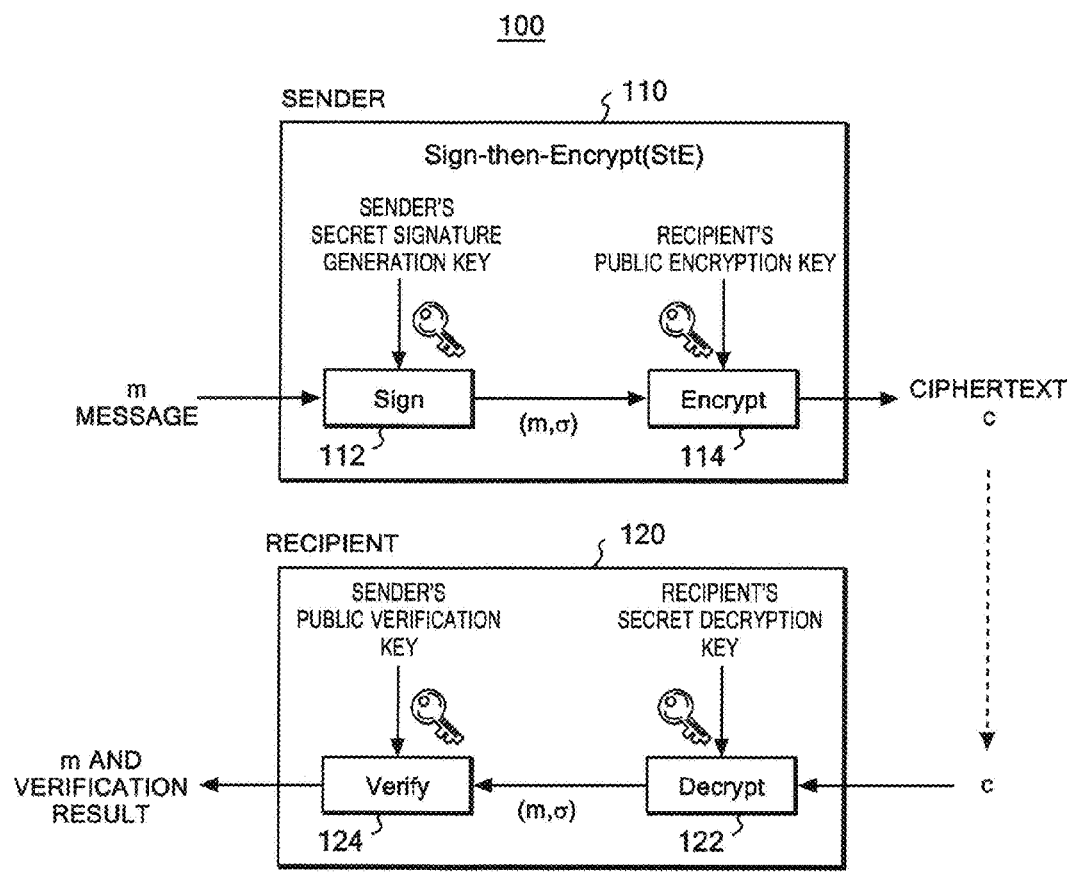
FIG. 1 shows a conventional Sign-then-Encrypt method.
Figure 2:
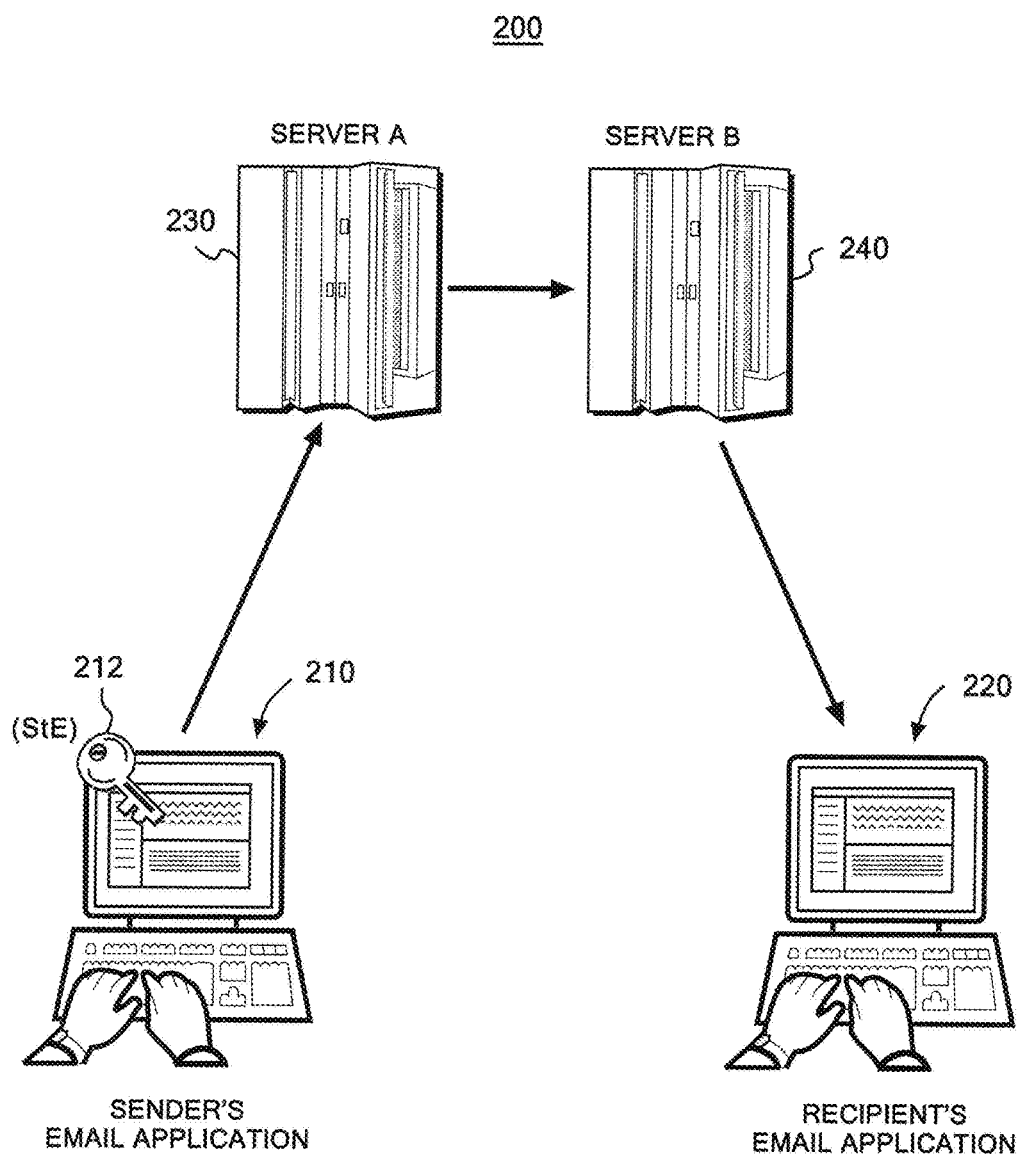
FIG. 2 shows an example of a traditional mail sending method.
Figure 3:
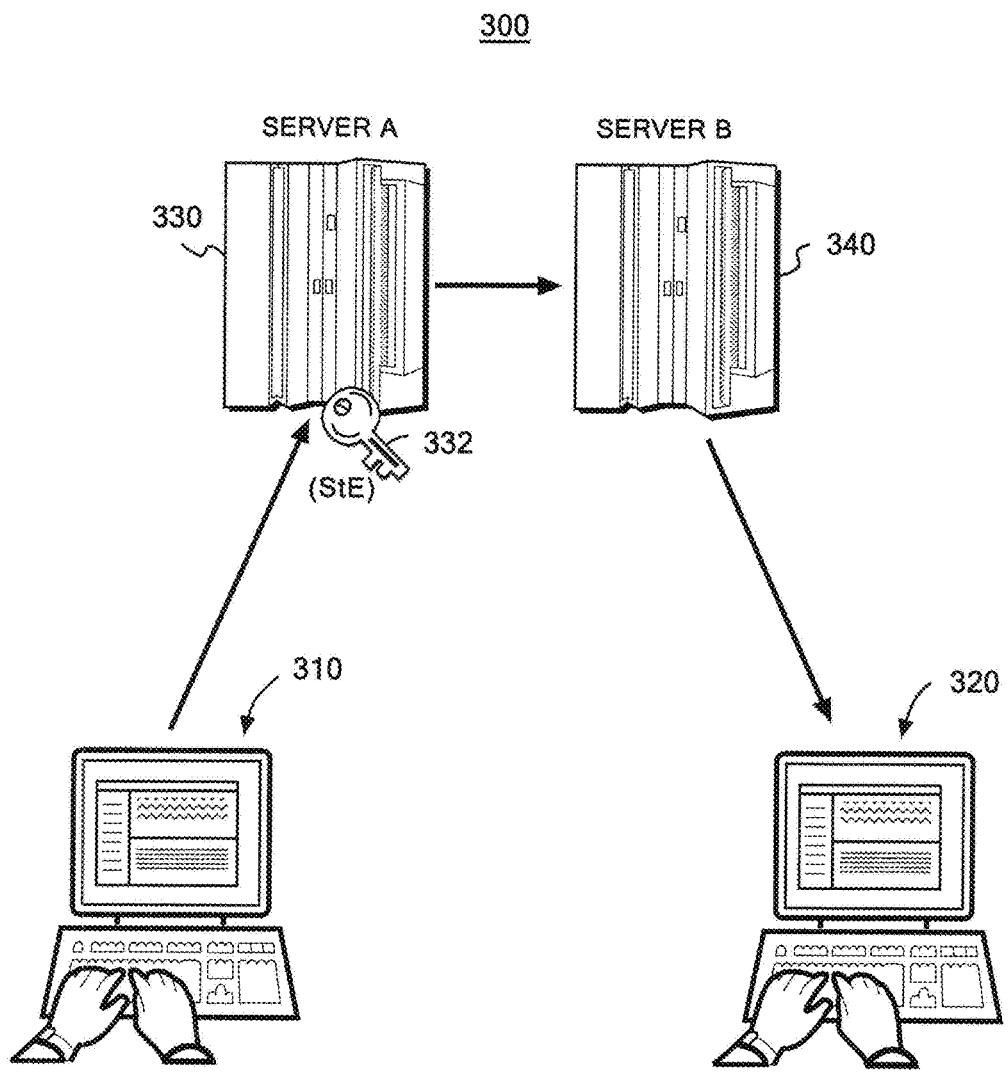
FIG. 3 shows an example of a case where an StE process is applied to an online email service.

Prior to a description of an outline of the present invention, a conventional Sign-then-Encrypt (StE) method 100 will be first described with an illustration shown in FIG. 1. At 112, a mail sender 110 signs an inputted message m with a secret signature generation key to generate a signature σ. Then, at 114, the mail sender 110 encrypts (m, σ) with a public encryption key of a recipient 120 to generate a ciphertext c. At 122, the recipient 120 decrypts the sent ciphertext c to obtain the message m and its verification result, at 124. When an StE process is executed by a program, information held in the StE program includes the secret signature generation key of the sender 110 and the public encryption key of the recipient 120. The mail recipient 120 decrypts the sent ciphertext c with the secret decryption key of the recipient 120, and verifies the decrypted text with the public verification key of the sender 110. FIG. 2 shows an example 200 where the aforementioned StE process is applied to a traditional mail sending method. In FIG. 2, the StE process is executed by an email application on a PC of a sender 210. Note key 212. Then, the thus encrypted mail arrives at a PC of a recipient 220 via a server A, 230, and then a server B, 240, and is decrypted and verified by an email application of the recipient 220. However, an online email service is mostly used in a current environment where mails are mainly sent and received via the Internet. This on-line service is provided by a server and a user sends and receives mails through a web browser. FIG. 3 shows a case 300 where an StE process is applied to the online email service. A server A, 330, executes the StE process on a mail upon generation of the mail on a PC of a sender 310 (note key 332), and sends the thus encrypted mail to a server B, 340. Then, the server B, 340, decrypts the encrypted mail, and eventually sends the thus decrypted and verified mail to a PC of a recipient 320.

If a program for the StE process illustrated in FIG. 3 is implemented in a usual (naive) way and held on the server A, 330, the secret signature generation key of a sender may be easily revealed from the StE program. At least some embodiments overcome this deficiency by providing a method for obfuscating this program and the obfuscated program is held on a server. There heretofore exist many versatile obfuscation tools for a program written in Java or C. However, the purpose of these tools is just to make a program difficult to read, and it is not thought that the tools completely prevent a secret key from being revealed. One or more embodiments are related not to a versatile obfuscation technique for a specific programming language, but to cryptographic obfuscation for a specific StE program. One aspect of at least some embodiments of the present invention is to design a pair of a signature scheme and an encryption scheme, the pair having a special property in which the following two processes are equivalent to each other:

1. When a certain message is given, the message is signed with the secret signature generation key of a sender. Then, the signed data is encrypted with the public encryption key of a recipient.

2. When a certain message is given, the secret signature generation key of a sender is encrypted with the public encryption key of a recipient. Then, the message is signed with the encrypted signature generation key.

The former process is an StE process targeted for obfuscation. "To encrypt the secret signature generation key of the sender with the public encryption key of the recipient" in the latter process corresponds to the obfuscation of one or more embodiments of the present invention. Specifically, the encrypted signature generation key of the sender is held in an obfuscated program, and is used to sign the given message. This makes the latter process equivalent to the former StE process. Since the encrypted signature generation key of the sender is encrypted information, it is possible to guarantee that the signature generation key of the sender is kept unrevealed from the information.

Figure 4:
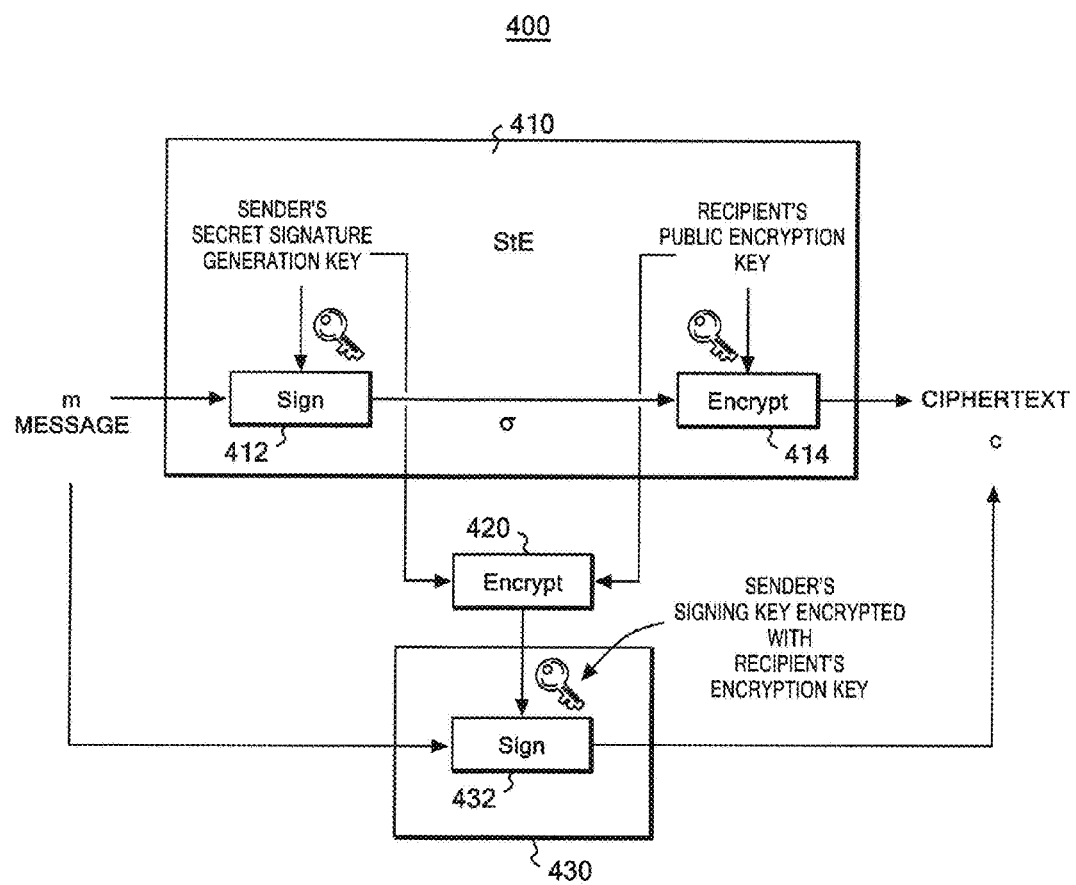
FIG. 4 is a view showing an exemplary embodiment of the present invention.

FIG. 4 shows an outline 400 of an exemplary embodiment of the present invention. In a conventional manner, an StE processor 410 signs, at 412, a message m with a secret signature generation key of a sender so as to generate a signature σ. Then, the StE processor 410 encrypts, at 414, the signature σ with the public encryption key of a recipient, and then outputs a ciphertext c. On the other hand, in one or more embodiments, the signature generation key of a sender is first encrypted, at 420, with the public encryption key of a recipient. This process corresponds to the obfuscation. Then, the encrypted signature generation key is held, and then used to sign a message m and output a ciphertext c, at 432. A processor 430 executing the above process corresponds to a program obtained by obfuscating the StE processor 410. The above process is executed to encrypt the signature σ for the message m, and not to encrypt the message m itself. The encryption of the message itself can be achieved by typical hybrid encryption using a public encryption key pk_e of a recipient, and does not require a secret signature generation key of a sender. Hence, the message does not need to be obfuscated, and is not targeted for the obfuscation according to one or more embodiments of the present invention.

A detailed description will be given of an exemplary embodiment of the present invention below.

Now, an abstract signature scheme will be considered as below.

Signature Scheme

Signature: s=Sign(sk_s, m) (where sk_s represents a secret signature generation key, m represents a message, and s represents a signature result)

Verification: Verify(pk_s, s, m) (where pk_s represents a public signature verification key)

The signature generation function Sign may use a random number internally. In such a case, s is generated stochastically.

Assume that the signature scheme satisfies the following three conditions.

Signature Scheme Condition 1 (as to Randomization of Signature Generation Key):

There is a function sk'_s=SigningKeyRandomize(sk_s, r) for randomizing a secret signature generation key sk_s with a random number r, and information on sk_s never leaks out from sk'_s. In addition, when sk'_s is rerandomized, i.e., when sk"_s=SigningKeyRandomize(sk'_s, r') is calculated with another random number r', sk"_s=SigningKeyRandomize(sk_s, r×r') is satisfied. In other words, to randomize sk_s twice with r and r' and to randomize sk_s once with r×r' are equivalent. Here, × represents a spatial arithmetic operation, such as addition or multiplication, between random numbers.

Signature Scheme Condition 2 (as to Randomization of Signature):

There is a function s'=SignatureRandomize(s, m, r) for randomizing the signature s with the message m and the random number r, and s cannot be restored from s'. In addition, SignatureRandomize(Sign(sk_s, m), m, r)=Sign(SigningKeyRandomize(sk_s, r), m) holds for any (m, r, sk_s). In other words, to randomize the signature for m with r and to calculate the signature for m with the signature generation key randomized with r are equivalent.

Signature Scheme Condition 3 (as to Calculation of Original Signature from Randomized Signature):

s=Sign(sk_s, m) can be calculated from the randomized signature s'=SignatureRandomize(s, m, r), the message m, and the random number r used for the randomization.

In the case of the BLS signature scheme (Boneh-Lynn-Shacham), for example, the signature generation function Sign(sk_s, m) is calculated as Exp(H(m), sk_s) by using a hash function H. In other words, the signature generation function Sign(sk_s, m) is calculated as the sk_s-th power of H(m) which is the hash value of m. In this case, all the above conditions are satisfied as described below.

Signature Scheme Condition 1:

sk'_s can be calculated as sk'_s=SigningKeyRandomize(sk_s, r)=sk_s×r. In addition, sk"_s=SigningKeyRandomize(sk'_s, r')=sk_s×r×r' holds, and thus sk"_s=SigningKeyRandomize(sk_s, r×r') is satisfied.

Signature Scheme Condition 2:

s' can be calculated as SignatureRandomize(s, m, r)=Exp(s, r). m is not used for this calculation.

Signature Scheme Condition 3:

The randomized signature is expressed as s'=Exp(H(m), sk_s×r). Accordingly, s=Sign(sk_s, m) can be calculated as Exp(s', 1/r) from s' and r. m is not used for this calculation.

All the above conditions are satisfied also in the case of the signature scheme of Schnorr (Non-patent Literature 5). In the signature scheme of Schnorr, the following calculations are performed as the signature generation function Sign(sk_s, m).

1. Generate a random number k, and then calculate x=Exp(g, k). Here, g represents a public parameter.

2. Calculate e=H(m, x) by using a hash function H.

3. Calculate y=k+e×sk_s.

4. Output (x, y) as a signature s.

In this case, all the above conditions are satisfied as described below.

Signature Scheme Condition 1:

sk'_s can be calculated as sk'_s=SigningKeyRandomize(sk_s, r)=sk_s+r. In addition, sk"_s=SigningKeyRandomize(sk'_s, r')=sk_s+r+r' holds, and thus sk"_s=SigningKeyRandomize(sk_s, r+r') is satisfied.

Signature Scheme Condition 2:

s' can be calculated as SignatureRandomize(s=(x, y), m, r)=(x, y+H(m, x)×r).

Signature Scheme Condition 3:

The randomized signature is expressed as s'=(x, y'=k+H(m, x)×(sk_s+r)). Accordingly, s=Sign(sk_s, m) can be calculated as (x, y'−H(m, x)×r) from s', m, and r.

All the above conditions are satisfied also in the case of the signature scheme of Waters (Non-patent Literature 7). In the signature scheme of Waters, the following calculations are performed as the signature generation function Sign(sk_s, m). Specifically, a random number k is generated, and then (sk_s×Exp(f(m), k), Exp(g, k)) is calculated as a signature s. Here, g represents a public parameter and f represents a public function. In this case, all the above conditions are satisfied as described below.

Signature Scheme Condition 1:

sk'_s can be calculated as sk'_s=SigningKeyRandomize(sk_s, r)=sk_s×r. In addition, sk"_s=SigningKeyRandomize(sk'_s, r')=sk_s×r×r' holds, and thus sk"_s=SigningKeyRandomize(sk_s, r×r') is satisfied.

Signature Scheme Condition 2:

s' can be calculated as SignatureRandomize(s=(sk_s×Exp(f(m), k), Exp(g, k)), m, r)=(r×sk_s×Exp(f(m), k), Exp(g, k)). m is not used for this calculation.

Signature Scheme Condition 3:

The randomized signature is expressed as s'=(s1', s2')=(r×sk_s×Exp(f(m), k), Exp(g, k)). Accordingly, s=Sign(sk_s, m) can be calculated as (s1'/r, s2') from s', m, and r. m is not used for this calculation.

In addition to the BLS signature scheme, Schnorr signature scheme, and Waters signature scheme, the signature scheme of Lysyanskaya (Non-patent Literature 6) and the like satisfy all the above conditions.

Next, an abstract encryption scheme will be considered as below.

Encryption Scheme

Encryption: c=Enc(pk_e, m) (where pk_e represents a public encryption key, m represents a message, and c represents a ciphertext)

Decryption: m=Dec(sk_e, c) (where sk_e represents a secret decryption key)

The encryption function Enc may use a random number internally. In such a case, c is generated stochastically.

In terms of the encryption scheme, one or more embodiments of the present invention take the following two properties into consideration. For example, the El Gamal encryption scheme (Non-patent Literature 3) has both of the properties.

Encryption Scheme with Homomorphic Property:

If Enc(pk_e, m1×m2) can be calculated when a ciphertext c1 of m1=Enc(pk_e, m1) and m2 are given for any message pair (m1, m2), then such an encryption scheme is referred to as having a homomorphic property. Here, × represents an arithmetic operation, such as addition or multiplication, as described in Signature Scheme Condition 1. For example, El Gamal encryption scheme (Non-patent Literature 3) has this property in terms of multiplication.

Rerandomizable Encryption Scheme:

This property is related to an encryption scheme in which a ciphertext c is generated stochastically. In a case where, when a ciphertext c=Enc(pk_e, m) and an encryption key pk_e are given for a certain message m, there is a stochastic algorithm c'=Rerandomize(c, pk_e) for rerandomizing the ciphertext c, and a stochastic distribution of c=Enc(pk_e, m) is equal to a stochastic distribution of c'=Rerandomize(c, pk_e), such an encryption scheme is referred to as being rerandomizable.

The following Sign-then-Encrypt program is conceivable by using the aforementioned pair of the encryption scheme and the signature scheme in combination. This program is targeted for the obfuscation according to one or more embodiments of the present invention.

Sign-then-Encrypt Program Targeted for Obfuscation

Input: a message m

Information to be held in the program: the secret signature generation key sk_s of a sender and the public encryption key pk_e of a recipient Output: a ciphertext of a signature for m Process Contents:

1. Calculate s=Sign(sk_s, m)
2. Generate a random number r
3. Calculate s'=SignatureRandomize(s, m, r) (see Signature Scheme Condition 2)
4. Calculate R=Enc(pk_e, r) (encryption of the random number r)
5. Output (s', R)

In other words, Step 1 corresponds to a signing process whereas Steps 2 to 5 correspond to an encryption process. The recipient having received (s', R) first decrypts R to calculate r, that is, calculates r=Dec(sk_e, R). Then, the recipient calculates the signature S from (s', m, r) in accordance with Signature Scheme Condition 3. Lastly, the recipient verifies the signature s by using the function Verify(pk_s, s, m).

As described in the description of the problem, the above program holds the secret signature generation key sk_s of the sender as it is, and thus the key is easily revealed. For this reason, the program should be obfuscated so that sk_s should not be revealed.

Obfuscated Sign-then-Encrypt Programs

Two kinds of obfuscated programs will be described below. Each of the obfuscated programs does not hold the secret signature generation key sk_s of the sender as it is, but holds a value sk'_s obtained by randomizing sk_s in accordance with Signature Scheme Condition 1, i.e., sk'_s=SigningKeyRandomize(sk_s, r). In addition, the program holds a ciphertext R obtained by encrypting r, i.e., R=Enc(pk_e, r). Owing to the security of Signature Scheme Condition 1 and the encryption, sk_s never leaks out from these pieces of information.

Obfuscated Sign-then-Encrypt Program 1

Input: a message m

Information to be held in the program:
1. sk'_s=SigningKeyRandomize(sk_s, r)
2. R=Enc(pk_e, r)
3. a public encryption key pk_e of the recipient Output: a ciphertext of a signature for m Process Contents:

1. Calculate s'=Sign(sk'_s, m) (where s'=SignatureRandomize(Sign(sk_s, m), m, r) is satisfied by Signature Scheme Condition 2)
2. Output (s', R)

The process to be performed by the recipient upon receipt of (s', R) is the same as that described above. Specifically, the recipient decrypts R to calculate r, that is, calculates r=Dec(sk_e, R). Then, the recipient calculates a signature s from (s', m, r) in accordance with Signature Scheme Condition 3. Lastly, the recipient verifies the signature s by using the function Verify(pk_s, s, m).

The obfuscated program described above may always produce the same output for the same message m in some cases, which is sometimes not preferable in terms of security. The output can be randomized by improving the program as described below. Since no change is made on the information to be held in the program, sk_s never leaks out from the program.

Obfuscated Sign-then-Encrypt Program 2

Input: a message m

Information to be held in the program: same as Program 1

Output: a ciphertext of a signature for m

Process Contents:

1. Generate a random number r'
2. Calculate sk"_s=SigningKeyRandomize(sk'_s, r') (where sk"_s=SigningKeyRandomize(sk_s, r×r') is satisfied by Signature Scheme Condition 1)
3. Calculate s"=Sign(sk"_s, m) (where s"=SignatureRandomize(Sign(sk_s, m), m, r×r') is satisfied by Signature Scheme Conditions 1 and 2)
4. Calculate a ciphertext R" of r×r' from R and r' in a case where the encryption scheme has the homomorphic property Here, R" may be rerandomized as needed in a case where the encryption scheme is rerandomizable. In this case, R"=Rerandomize(R", pk_e) is calculated, and then (s", R") is outputted. R" cannot be calculated in a case where the encryption scheme does not have the homomorphic property. In this case, R'=Enc(pk_e, r') is calculated, and then (s", (R, R')) is outputted instead of (s", R"). At this time, R may be rerandomized as needed by calculating R=Rerandomize(R, pk_e).

In a case where the encryption scheme has the homomorphic property, the recipient performs the following process (decryption verification) upon receipt of (s", R"). First, the recipient decrypts R" to calculate r×r', that is, calculates r×r'=Dec(sk_e, R"). Then, the recipient calculates a signature s from (s', m, r×r') in accordance with Signature Scheme Condition 3. Lastly, the recipient verifies the signature s by using the function Verify(pk_s, s, m).

In a case where the encryption scheme does not have the homomorphic property, the recipient performs the following process (decryption verification method) upon receipt of (s", (R, R')). First, the recipient decrypts R and R' to calculate r and r', that is, calculates r=Dec(sk_e, R) and r'=Dec(sk_e, R'). Then, the recipient calculates a signature s from (s', m, r×r') in accordance with Signature Scheme Condition 3. Lastly, the recipient verifies the signature s by using the function Verify (pk_s, s, m).

Online Email Service

An StE process in an online email service may be securely performed with the program obfuscated by using one or more embodiments of the present invention. Hereinafter, a description will be given of an example of a case where a sender sends a recipient a mail. Note that, the secret signature generation key and public signature verification key of the sender as well as the public encryption key and secret decryption key of the recipient are assumed to be managed by a key management center based on PKI (Public Key Infrastructure). Further, a PKI server 610 provides functions of a certification authority (CA) and a registration authority (RA) which are used for realizing the PKI system. In other words, the PKI server 610 performs issuance of, and manages operations on, digital certificates by using PKI. As shown in table 900 of FIG. 9, the PKI server 610 manages, for each user, a public encryption key and a secret decryption key for encryption, as well as a public verification key and a secret signing key for signing.

Figure 5:
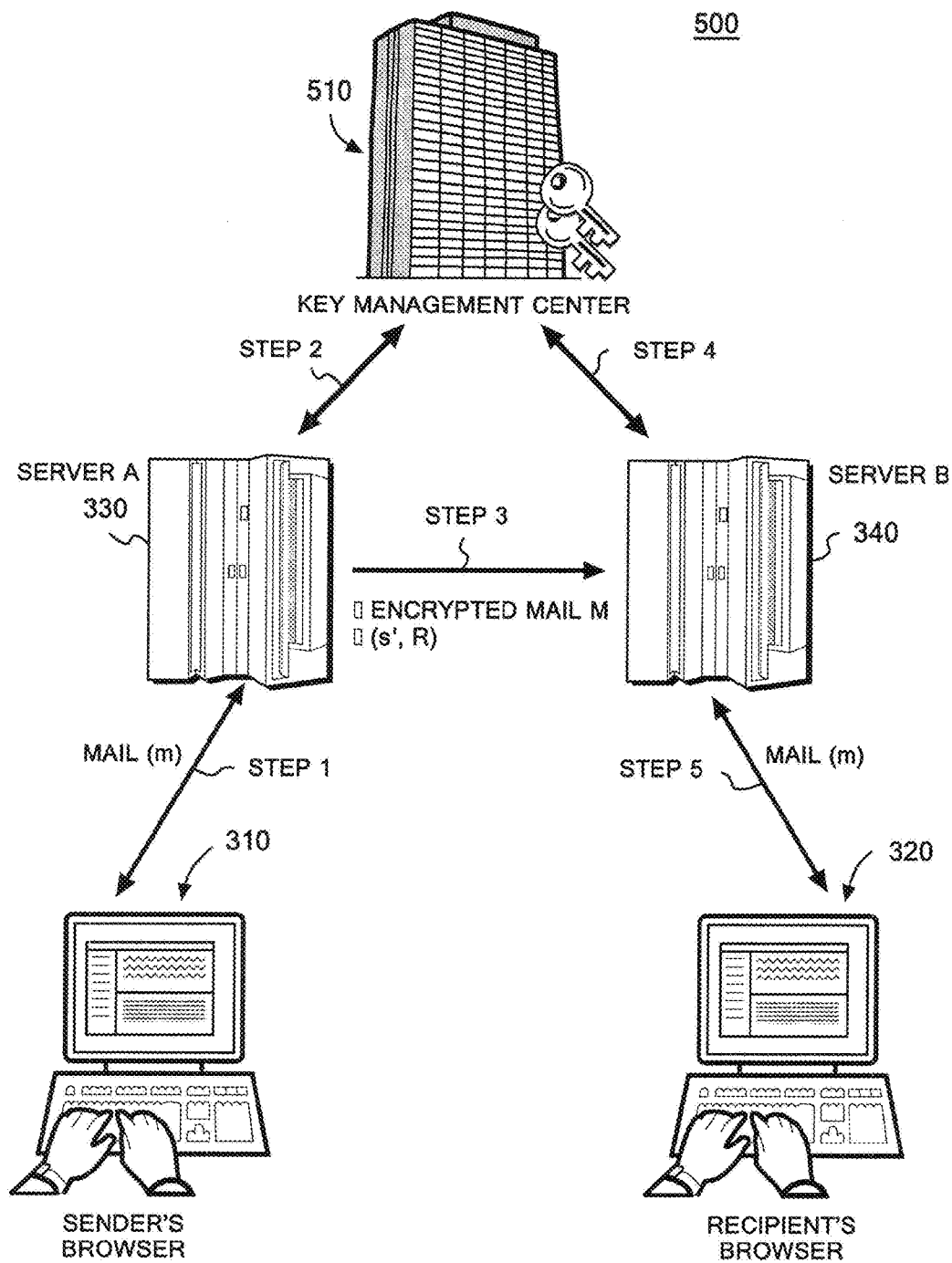
FIG. 5 shows an outline of an exemplary StE process in an online email service employing aspects the invention.

FIG. 5 illustrates an outline 500 of an StE process in an online email service using an embodiment of the present invention.

Step 1: A sender 310 accesses a service of a server A, 330, generates a mail m on a browser of the sender 310, and presses a send button. The mail m is sent to the server A.

Step 2: The server A, 330, acquires, from a key management center 510, the public encryption key of a recipient 320 and an obfuscated StE program for sending from the sender 310 to the recipient 320.

Step 3: The server A, 330, generates a ciphertext of the mail m with the public encryption key of the recipient 320, and also generates a ciphertext of a signature for the mail m with the obfuscated StE program. Then, the server A sends these ciphertexts to a server B, 340.

Step 4: The server B, 340, acquires, from the key management center 510, the secret decryption key of the recipient 320 and the public signature verification key of the sender 310. Then, the server B decrypts the encrypted mail m, as well as decrypts and verifies the signature.

Step 5: The recipient 320 accesses a service of the server B, 340, and thus reads the mail m from the sender 310 on a browser. In this event, the signature verification result is displayed on the browser. Steps 2 to 5 mentioned above will be described in more detail.

Figure 6:
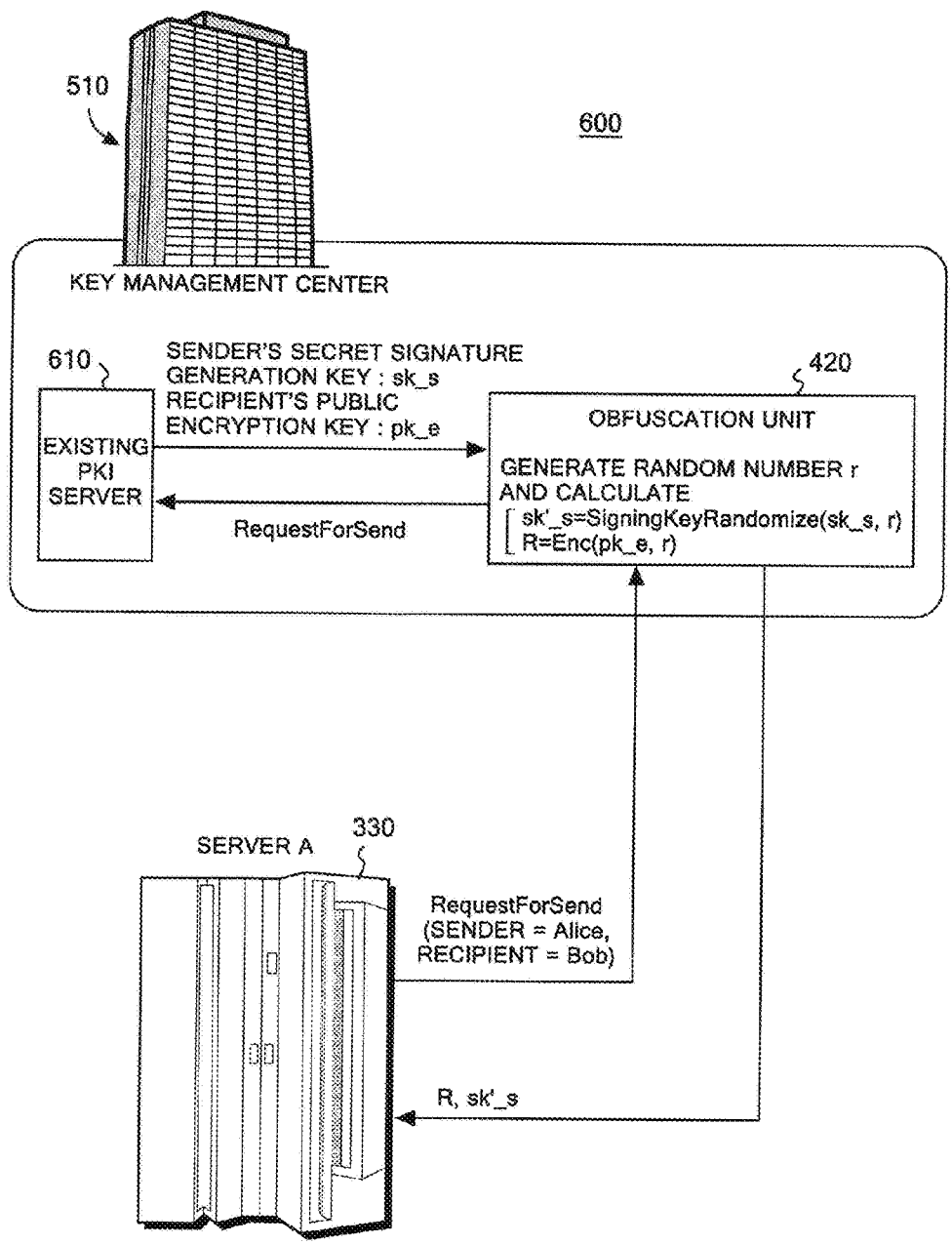
FIG. 6 is a view showing a detailed operation of Step 2.

FIG. 6 shows a detailed operation 600 of Step 2. The server A, 330, first sends information on the sender 310 and the recipient 320 to an obfuscation unit 420 of the key management center 510. Here, the information indicates information, such as names and user IDs of the sender and recipient, with which users can be specified. The obfuscation unit 420 sends a PKI server 610 the information on the sender and recipient, and acquires, from the PKI server, the secret signature generation key sk_s of the sender and the public encryption key pk_e of the recipient.

Then, the obfuscation unit 420 sends the server A, 330: a signature generation key sk'_s=SigningKeyRandomize(sk_s, r) obtained by randomizing the secret signature generation key sk_s of the sender 310 with a random number r; and R=Enc(pk_e, r) obtained by encrypting the random number r with the public encryption key pk_e of the recipient 320. Here, acquisition of the randomized signature generation key sk'_s and the ciphertext R by the server A, 330, is referred to as acquisition of the obfuscated StE program by the server A, 330.

In Step 3, the server A, 330, first generates a ciphertext M of the mail m by using the public encryption key pk_e of the recipient 320. Then, the server A calculates s'=Sign(sk'_s, m) by using the obfuscated StE program (sk'_s and R). Thereafter, the server A sends M and (s', R) to the server B, 340. Here, (s', R) represents a process result of the obfuscated Sign-then-Encrypt program 1. Alternatively, the server A, 330, may execute a process of the obfuscated Sign-then-Encrypt program 2.

Figure 7:
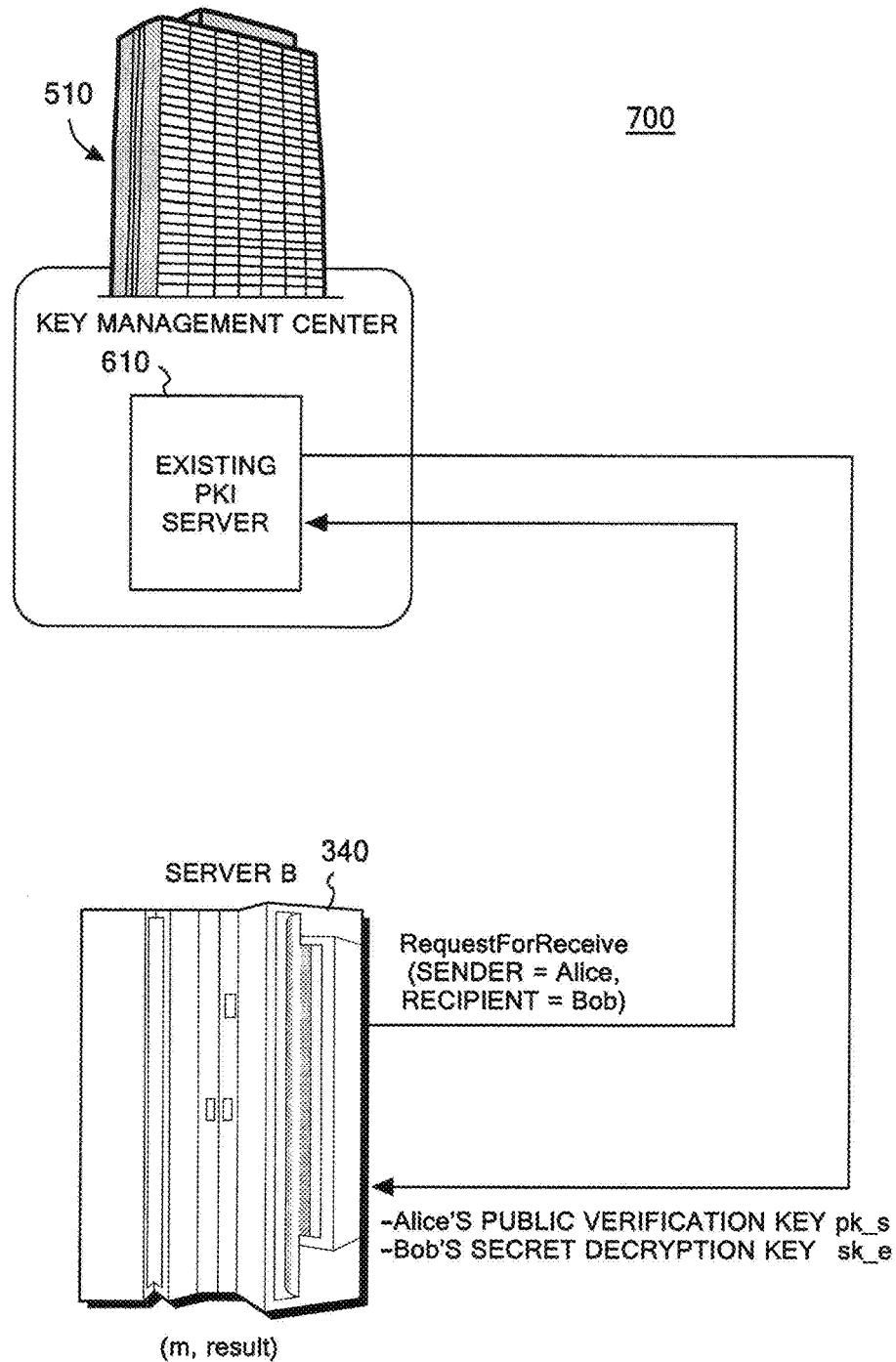
FIG. 7 is a view showing a detailed operation of Step 4.

FIG. 7 shows a detailed operation 700 of Step 4. The server B, 340, first receives the ciphertext M and the process result (s', R) of the obfuscated StE program. The server B, 340, then sends the PKI server 610 information on the sender 310 and the recipient 320, and acquires, from the PKI server 610, the public verification key pk_s of the sender and the secret decryption key sk_e of the recipient. The server B, 340, thus decrypts the mail m from the ciphertext M.

The server B, 340, subsequently decrypts R with the secret decryption key sk_e of the recipient 320 to obtain the original random number r, and calculates a signature s from (s', m, r) in accordance with Signature Scheme Condition 3. Then, the server B calculates result=Verify(pk_s, s, m) as the signature verification result by using the public verification key pk_s of the sender 310.

Figure 8:
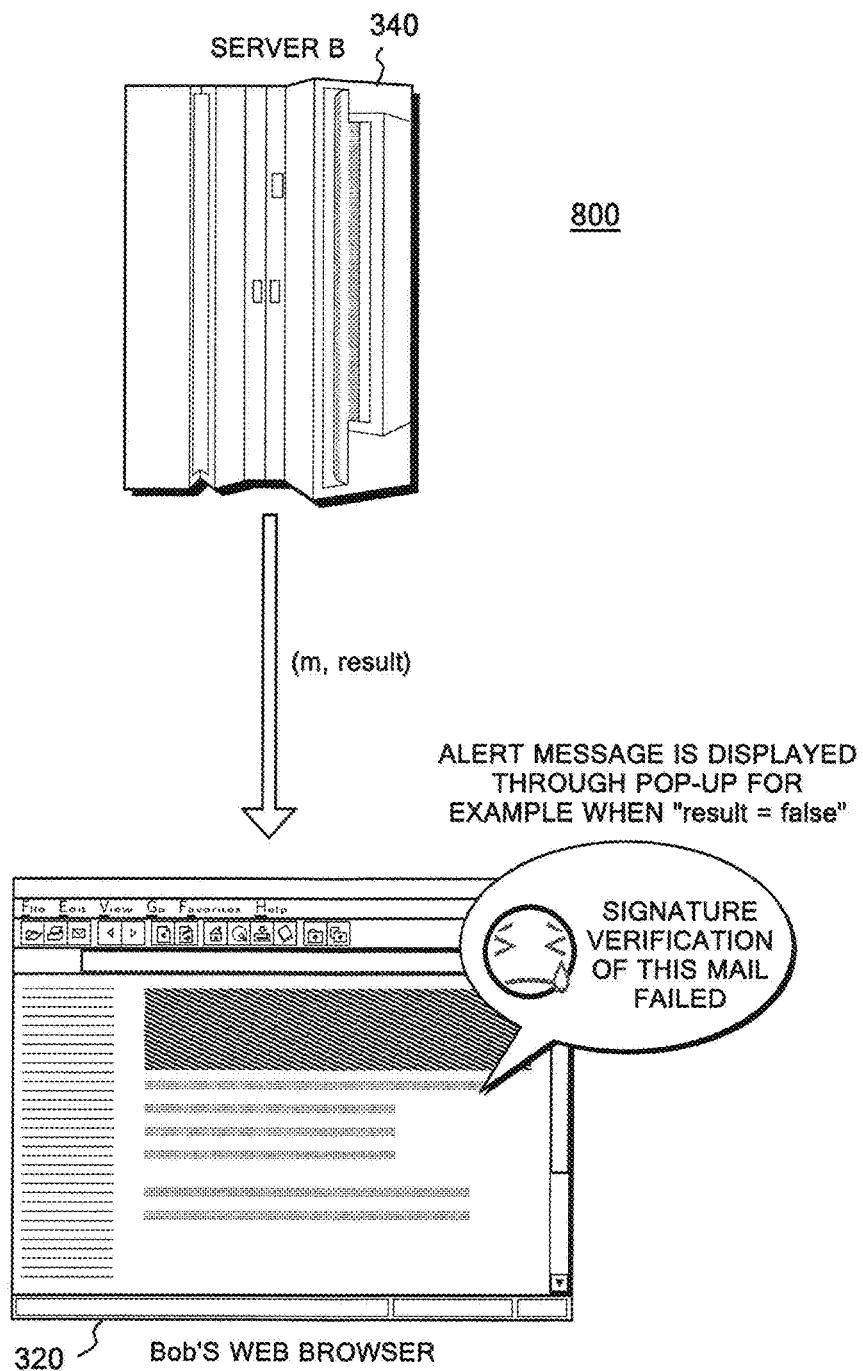
FIG. 8 is a view showing a detailed operation of Step 5.

FIG. 8 shows a detailed operation 800 of Step 5. The recipient 320 accesses a service of the server B, 340, and thus reads the mail m from the sender 310 on a browser. In this event, the signature verification result calculated in the server B, 340, is displayed on the browser. FIG. 8 shows a case where the signature verification fails. In this example, the recipient 320 is notified, via a pop-up window, of an alert message on the verification failure.

Figure 11:
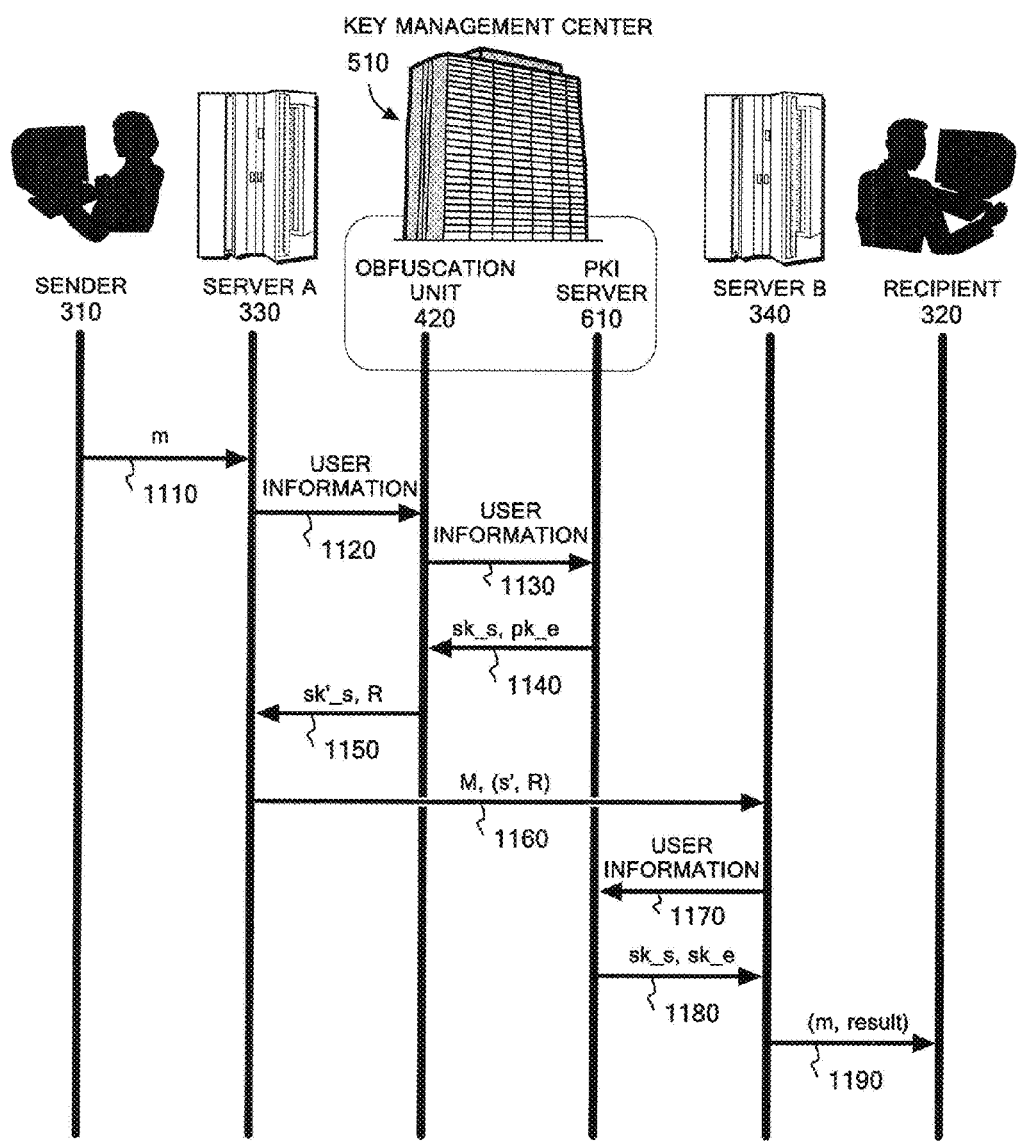
FIG. 11 is a process transition chart of the entirety of Steps 1 to 5.

FIG. 11 shows a process transition chart of the entirety of Steps 1 to 5 described above.

In Step 1110, the sender 310 accesses the service of the server A, 330, generates the mail m on the browser of the sender 310, and presses the send button. At this time, the mail m is sent to the server A.

In Step 1120, the server A, 330, accesses the key management center 510 to acquire the obfuscated StE program. More specifically, the server A, 330, sends information on the sender 310 and the recipient 320 to the obfuscation unit 420 of the key management center 510. Here, the information indicates information, such as names and user IDs of the sender and recipient, with which users can be specified.

In Step 1130, the obfuscation unit 420 sends the PKI server 610 the information on the sender 310 and the recipient 320.

In Step 1140, the PKI server 610 sends the obfuscation unit 420 the secret signature generation key sk_s of the sender 310 and the public encryption key pk_e of the recipient 320.

In Step 1150, the obfuscation unit 420 sends the server A, 330: the signature generation key sk'_s=SigningKeyRandomize(sk_s, r) obtained by randomizing the secret signature generation key sk_s of the sender 310 with the random number r; and R=Enc(pk_e, r) obtained by encrypting the random number r with the public encryption key pk_e of the recipient 320.

In Step 1160, the server A, 330, first generates the ciphertext M of the mail m by using the public encryption key pk_e of the recipient 320. Then, the server A calculates s'=Sign (sk'_s, m) by using the obfuscated StE program (sk'_s and R). Thereafter, the server A sends M and (s', R) to the server B, 340. Here, (s', R) represents the process result of the obfuscated Sign-then-Encrypt program 1. Alternatively, the server A may execute the process of the obfuscated Sign-then-Encrypt program 2.

In Step 1170, on receiving the mail, the server B (340) receives the ciphertext M and the process result (s', R) of the obfuscated StE program. The server B then sends the PKI server 610 the information on the sender 310 and the recipient 320.

In Step 1180, the PKI server 610 sends the server B, 340, the public verification key pk_s of the sender and the secret decryption key sk_e of the recipient.

In Step 1190, the server B, 340, acquires, from the PKI server 610, the public verification key pk_s of the sender and the secret decryption key sk_e of the recipient. The server B thus decrypts the mail m from the ciphertext M. The server B subsequently decrypts the random number R with the secret decryption key sk_e of the recipient 320 to obtain the original random number r, and calculates a signature s from (s', m, r) in accordance with Signature Scheme Condition 3. Then, the server B calculates result=Verify(pk_s, s, m) as a signature verification result by using the public verification key pk_s of the sender 310. This process corresponds to the decryption verification method and the decryption verification program. Lastly, the server B sends (m, result) to the recipient 320.

Block Diagram of Computer Hardware

Figure 10:
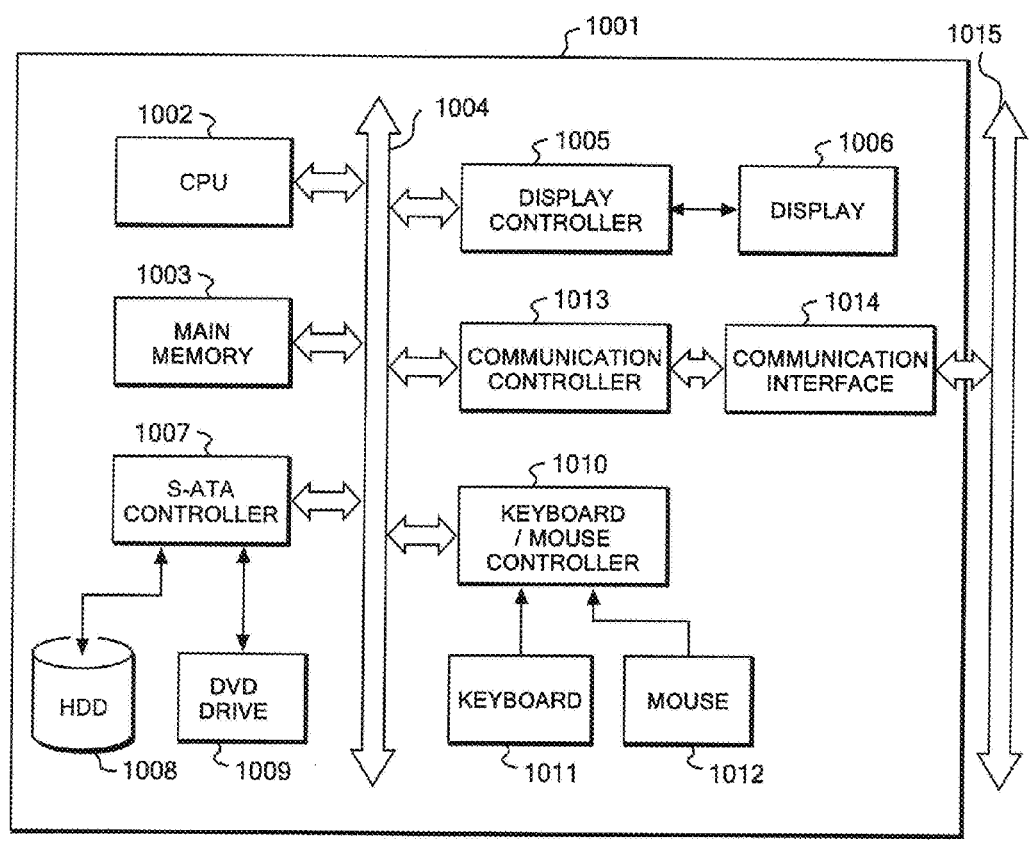
FIG. 10 shows an example of a block diagram of computer hardware included in each server.

FIG. 10 shows an example of a block diagram of computer hardware included in each server (a mail sending server and a mail receiving server) of one or more embodiments of the present invention. A computer system 1001 according to the embodiment of the present invention includes a CPU 1002 and a main memory 1003 which are connected to a bus 1004. The CPU 1002 is preferably based on 32-bit or 64-bit architecture. For example, the XEON series, CORE series, ATOM series, PENTIUM series, and CELERON series CPUs of Intel Corporation, and the PHENOM series, ATHLON series, TURION series, and SEMPRON series CPUs of Advanced Micro Devices, Inc. may be used as the CPU 1002.

A display 1006 such as an LCD monitor is connected to the bus 1004 through a display controller 1005. The display 1006 is used to display, on a proper graphic interface, information on the computer system 1001 connected to a network via a communication line 1015 and information on software running on the computer system 1001, for the purpose of managing the computer system 1001. Also, a hard disk or a silicon disk 1008, and a CD-ROM drive, a DVD drive, or a Blu-ray drive 1009 are connected to the bus 1004 through an IDE or SATA controller 1007.

An operating system, programs (a mail sending program and a mail receiving program) including codes of the present invention, and data are stored in the hard disk 1008 to be loadable in the main memory 1003. Data on messages, mails, and various keys to be used in the StE process of the present invention are stored in either the hard disk 1008 or the main memory 1003, and subjected to an encryption or decryption process by the CPU 1002. A program for executing an online email service is preferably stored in the hard disk 1008, and loaded into the main memory 1003 and executed as needed to provide a service to a user.

The CD-ROM drive, the DVD drive, or the Blu-ray drive 1009 is used to additionally load a program as needed from a CD-ROM, a DVD-ROM or a Blu-ray disk into the hard disk 1008. A keyboard 1011 and a mouse 1012 are also connected to the bus 1004 through a keyboard/mouse controller 1010. The data of the present invention may be stored in the abovementioned external storage, and be read therefrom.

A communication interface 1014 is compliant with an Ethernet protocol, for example. The communication interface 1014 is connected to the bus 1004 through a communication controller 1013 and functions to physically connect the computer system 1001 and the communication line 1015. The communication interface 1014 also provides a network interface layer to a TCP/IP communication protocol which is a communication function of the operating system of the computer system 1001. Here, the communication line 1015 may be a wired LAN environment, or a wireless LAN environment based on a wireless LAN connection standard such as IEEE 802.11a/b/g/n. The computer system 1001 provides an online email service to a user through the communication interface 1014.

Having reviewed the disclosure herein, including FIG. 10, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium (e.g., signals on line 1015) or a computer readable storage medium (e.g., HDD 1008, DVD in drive 1009). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying aspects of embodiments of the invention can be, in at least some cases, embodied on a computer readable storage medium The following effects and the like are expected in one or more embodiments of the present invention even if an obfuscated StE program for sending from a sender to a recipient should be revealed and be obtained by an attacker.

1. The attacker cannot falsify a signature of the sender.
2. The attacker cannot execute an StE process for sending from the sender to a third party other than the recipient.
3. The revealed program can be made worthless by updating the recipient's public key as soon as possible upon the revealing of the program. In this event, update of the secret signature generation key of the sender is not required.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A message decryption method performed by a computer including a processor and a memory, the method comprising the steps of:
receiving a first communication including:
a ciphertext M of a mail m generated using a public encryption key pk_e of a recipient, and
a process result of an obfuscated sign-then-encrypt program, said process result in turn comprising:
a randomized signature s' comprising a signature s randomized with said mail m and an original random number r, and
an encrypted random number R comprising said original random number r encrypted with the public encryption key pk_e of said recipient of said mail m;
sending, in response to the first communication, information about a sender of the mail m and said recipient of the mail m;
receiving a public verification key pk_s of the sender of the mail m and a secret decryption key sk_e of the recipient of the mail m, said secret decryption key sk_e corresponding to the public encryption key pk_e of said recipient of the mail m;
decrypting the mail m from the ciphertext M;
decrypting the encrypted random number R with said secret decryption key sk_e to obtain said original random number r;
calculating said signature s from the randomized signature s', the mail m and the original random number r obtained from decrypting the encrypted random number R; and
verifying the signature s by calculating a signature verification result using the public verification key pk_s of the sender.

2. The method of claim 1, wherein the step of decrypting the mail m from the ciphertext M comprises decrypting the ciphertext M by using the secret decryption key sk_e of the recipient.

3. The method of claim 1, wherein the step of sending, in response to the first communication, information about the sender of the mail m and the recipient of the mail m comprises sending the information about the sender of the mail m and the recipient of the mail m to a Public Key Infrastructure (PKI) server.

4. The method of claim 3, wherein the public verification key pk_s of the sender of the mail m and the secret decryption key sk_e of the recipient of the mail m are received from the PKI server.

5. The method of claim 1, further comprising sending the mail m to the recipient.

6. The method of claim 1, further comprising notifying the recipient of a failure in the verification of the signature.

7. A non-transitory computer readable medium comprising computer executable instructions which when executed by a computer cause the computer to perform the method of:
receiving a first communication including:
a ciphertext M of a mail m generated using a public encryption key pk_e of a recipient, and
a process result of an obfuscated sign-then-encrypt program, said process result in turn comprising:
a randomized signature s' comprising a signature s randomized with said mail m and an original random number r, and
an encrypted random number R comprising said original random number r encrypted with the public encryption key pk_e of said recipient of said mail m;
sending, in response to the first communication, information about a sender of the mail m and said recipient of the mail m;
receiving a public verification key pk_s of the sender of the mail m and a secret decryption key sk_e of the recipient of the mail m, said secret decryption key sk_e corresponding to the public encryption key pk_e of said recipient of the mail m; and
decrypting the mail m from the ciphertext M;
decrypting the encrypted random number R with said secret decryption key sk_e to obtain said original random number r;
calculating said signature s from the randomized signature s', the mail m and the original random number r obtained from decrypting the encrypted random number R; and
verifying the signature s by calculating a signature verification result using the public verification key pk_s of the sender.

8. The non-transitory computer readable medium according to claim 7, wherein the computer executable instructions to decrypt the mail m from the ciphertext M comprises computer executable instructions to decrypt the ciphertext M by using the secret decryption key sk_e of the recipient.

9. The non-transitory computer readable medium of claim 7, wherein the computer executable instructions to send the information about the sender of the mail m and the recipient of the mail m comprises executable instructions to send the information about the sender of the mail m and the recipient of the mail m to a Public Key Infrastructure (PKI) server.

10. The non-transitory computer readable medium according to claim 9, wherein the public verification key pk_s of the sender of the mail m and the secret decryption key sk_e of the recipient of the mail m are received from the PKI server.

11. The non-transitory computer readable medium according to claim 7, further comprising computer executable instructions to send the mail m to the recipient.

12. The non-transitory computer readable medium according to claim 7, further comprising computer executable instructions to notify the recipient of a failure in the verification of the signature.

13. An apparatus comprising:
   means for receiving a first communication including:
      a ciphertext M of a mail m generated using a public encryption key pk_e of a recipient, and
      a process result of an obfuscated sign-then-encrypt program, said process result in turn comprising:
         a randomized signature s' comprising a signature s randomized with said mail m and an original random number r, and
         an encrypted random number R comprising said original random number r encrypted with the public encryption key pk_e of said recipient of said mail m;
   means for sending, in response to the first communication, information about a sender of the mail m and said recipient of the mail m;
   means for receiving a public verification key pk_s of the sender of the mail m and a secret decryption key sk_e of the recipient of the mail m, said secret decryption key sk_e corresponding to the public encryption key pk_e of said recipient of the mail m;
   means for decrypting the mail m from the ciphertext M;
   means for decrypting the encrypted random number R with said secret decryption key sk_e to obtain said original random number r;
   means for calculating said signature s from the randomized signature s', the mail m and the original random number r obtained from decrypting the encrypted random number R; and
   means for verifying the signature s by calculating a signature verification result using the public verification key pk_s of the sender.

14. The apparatus of claim 13, wherein the means for decrypting the mail m from the ciphertext M decrypts the ciphertext M by using the secret decryption key sk_e of the recipient.

15. The apparatus of claim 13, wherein the means for sending the information about the sender of the mail m and the recipient of the mail m sends the information about the sender of the mail m and the recipient of the mail m to a Public Key Infrastructure (PKI) server.

16. The apparatus of claim 15, wherein the public verification key pk_s of the sender of the mail m and the secret decryption key sk_e of the recipient of the mail m are received from the PKI server.

17. The apparatus of claim 13, further comprising means for sending the mail m to the recipient.

18. The apparatus of claim 13, further comprising means for notifying the recipient of a failure in the verification of the signature.

* * * * *